Figure 1:
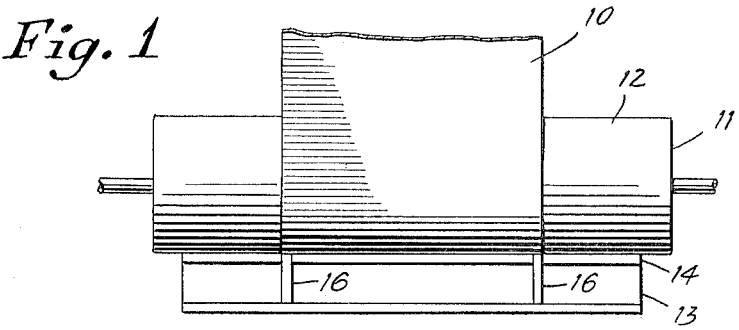

May 24, 1966 R. R. GROWDON ETAL 3,252,443
AIR CURRENT-SEAL FOR WORK CONFINED-POOL COATER
Filed Jan. 31, 1961 6 Sheets-Sheet 1

INVENTORS
RICHARD R. GROWDON, ANDRE J. PELLETIER,
HERBERT D. HAMILTON & JAMES D. MALONEY, Jr.

BY
ATTORNEY

May 24, 1966   R. R. GROWDON ETAL   3,252,443
AIR CURRENT-SEAL FOR WORK CONFINED-POOL COATER
Filed Jan. 31, 1961   6 Sheets-Sheet 2
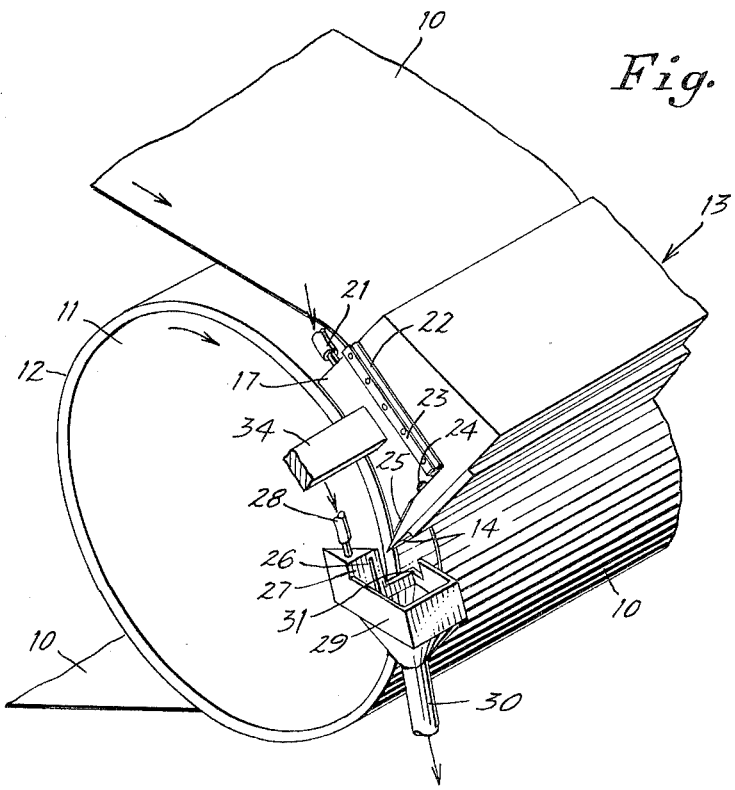
Fig. 4
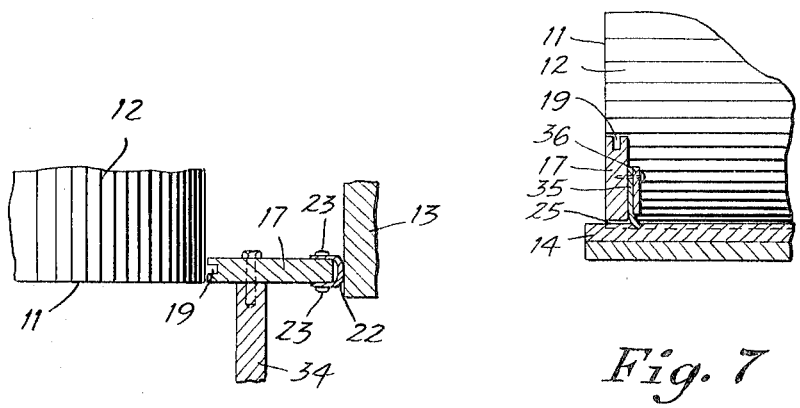
Fig. 6
Fig. 7
INVENTORS
RICHARD R. GROWDON, ANDRE J. PELLETIER,
HERBERT D. HAMILTON & JAMES D. MALONEY, JR.
BY *Irwin V. Glesim*
ATTORNEY May 24, 1966  R. R. GROWDON ETAL  3,252,443
AIR CURRENT-SEAL FOR WORK CONFINED-POOL COATER
Filed Jan. 31, 1961  6 Sheets-Sheet 3

INVENTORS
RICHARD R. GROWDON, ANDRE J. PELLETIER,
HERBERT D. HAMILTON & JAMES D. MALONEY, Jr.

BY  *Irwin V. Gleim*

ATTORNEY

May 24, 1966 R. R. GROWDON ET AL 3,252,443
AIR CURRENT-SEAL FOR WORK CONFINED-POOL COATER
Filed Jan. 31, 1961 6 Sheets-Sheet 5
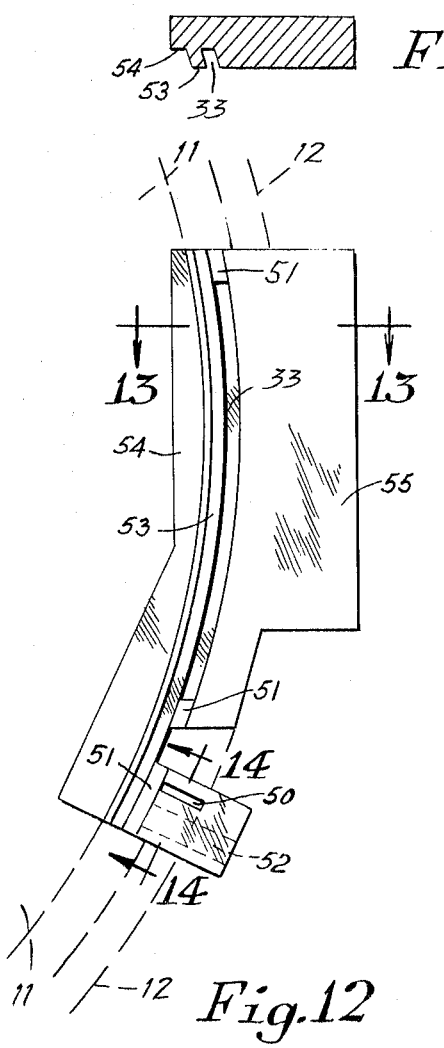
Fig. 14
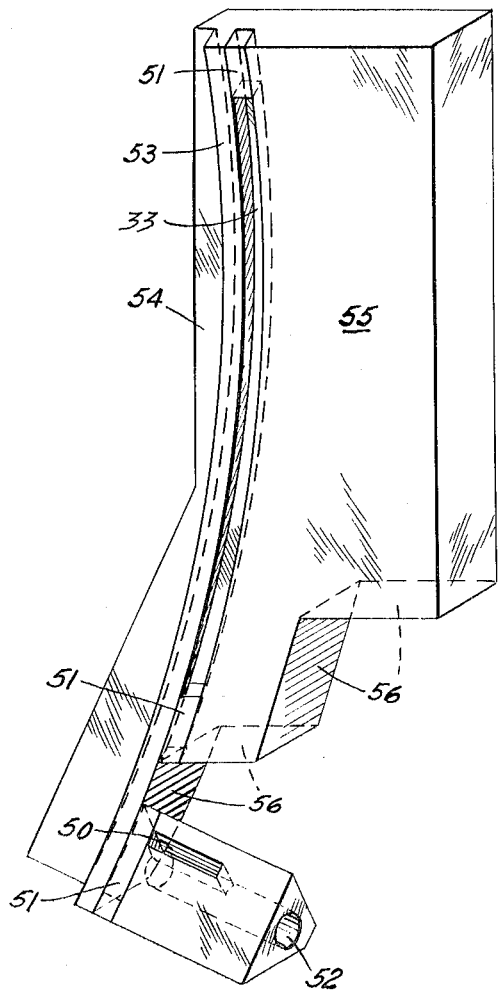
INVENTORS
RICHARD R. GROWDON, ANDRE J. PELLETIER,
HERBERT D. HAMILTON & JAMES D. MALONEY, Jr.
BY Irwin V. Glenn
ATTORNEY INVENTORS
RICHARD R. GROWDON, ANDRE J. PELLETIER,
HERBERT D. HAMILTON & JAMES D. MALONEY,Jr.

BY Irwin V. Gleim
ATTORNEY

United States Patent Office 3,252,443
Patented May 24, 1966

---

3,252,443
AIR CURRENT-SEAL FOR WORK CONFINED-POOL COATER
Richard R. Growdon, Escanaba, Mich., and Andre J. Pelletier, Herbert D. Hamilton, and James D. Maloney, Jr., Chillicothe, Ohio, assignors to The Mead Corporation, Dayton, Ohio, a corporation of Ohio
Filed Jan. 31, 1961, Ser. No. 86,030
10 Claims. (Cl. 118—407)

This invention relates to paper coating machines and more particularly to such machines which utilize a pool of fluent coating material contained between a stationary member and a rotating member, or between two rotating members. In such machines, a pool of fluent coating material is retained in a desired location by end-dams or dikes which prevent free overflow of the coating material from the ends of the coating members.

Illustrative of coating machines having a stationary member and a rotating member are blade coaters which pass a web of paper, supported by a rotating roll through a pool of fluent coating material and thence past a trailing blade bearing on the web to limit and smooth the coating applied to the web. Illustrative of coating machines having two rotating members are those which utilize a pool of fluent coating material in the nip trough of two rolls rotating in contact. The end-dams of the present invention may be used to advantage with either type of coating machine as more fully hereinafter set forth.

Various attempts have been made in the past to provide effective end-dams for such paper coating machines, but all have suffered from one or more serious disadvantages which have limited their utility. Prior art end-dams have the common characteristic of requiring actual frictional contact between the edge of the end-dam and the rotating surface or surfaces. And such a structure demands that the edge of the end-dam in engagement with the rotating surface have precisely the same curvature as the rotating surface. If this requirement is not met, gaps between the rotating surface and the curved edge of the end-dam permit leakage of the fluent coating material which desirably the end-dams are used to prevent. Should the curved edge of the end-dam have a lesser radius than the rotating surface, one or more points of higher bearing pressure result, so that the area of the rotating surface in contact with the end-dam is subjected to abnormal wear which forms a groove in the rotating surface.

As the conventional rotating surfaces are rolls having a resilient outer covering, which are reground to maintain their desired smoothness, relatively frequent changes in roll radius result, so that the curvature of the edge of the end-dam no longer conforms to the curvature of the roll, after the roll has been reground a few times. And attempts to minimize the lack of "good fit" between the edge of the end-dam and the roll surface have placed the end-dams so that they engage the edge of the paper web which is in turn supported by the roll. Even so, the backing roll surface is deformed and grooved by the pressure of the end-dam, and such grooved backing rolls must be reground to a smooth surface before wider webs can be coated.

As the tip of the blade wears and the blade is advanced to maintain coat weight, an opening results at the blade-end dam-backing roll interface. Attempts to seal this opening by advancing the end dam and/or applying pressure underneath the blade results in increased pressure on the backing roll and excessive wear.

A more recent effort to overcome some of the defects in end-dams has provided an adjustable felt gasket for effecting a seal between the edge portion of the paper web carried by the backing roll and the edge of the end-dam. However, during use, the felt becomes more or less saturated with the fluent coating material and loses much of its resilient character. Increasing pressure is then required for effective sealing, and the indenting or grooving of the backing roll still occurs, although perhaps at a reduced rate.

It is, therefore, a principal object of this invention to overcome the above noted deficiencies by providing an end-dam with a fluid seal between the roll surface and the edge of the end-dam.

It is a further object of this invention to locate such end-dams remote from the edges of the paper web, to give maximum flexibility in the width of the paper web to be coated.

It is yet another object of this invention to mount the end-dams independently of the coating head assembly, with resilient back-sealing means, to permit blade adjustment without requiring a concurrent end-dam adjustment.

Still another object is to provide for circulation of fluent coating material through the pool, to prevent accumulation of grit therein.

Figure 2:
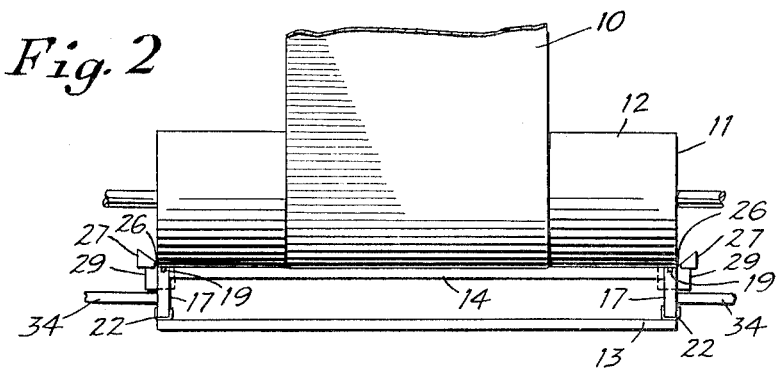
Figure 3:
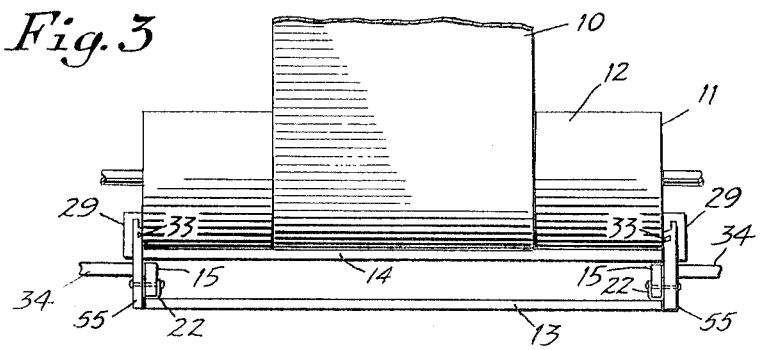
Figure 5:
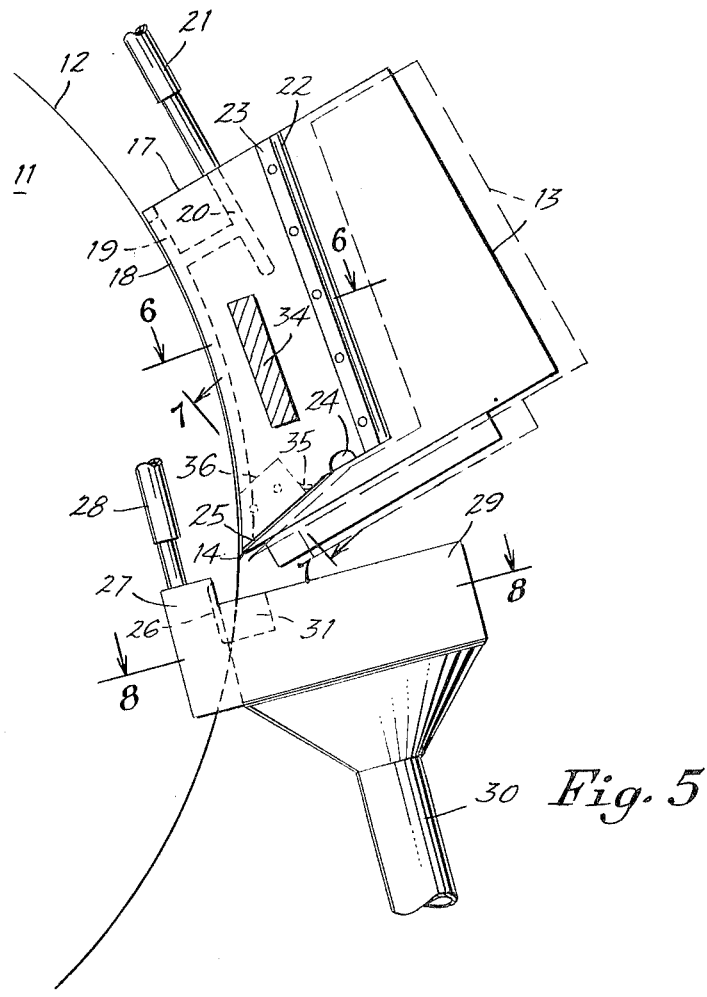
Figure 8:
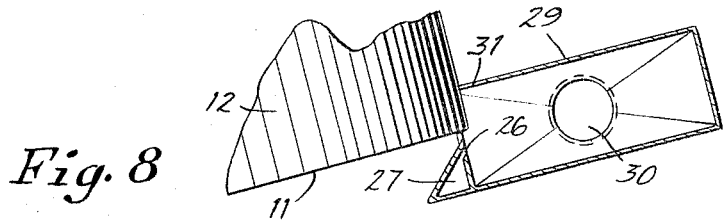
Figure 9:
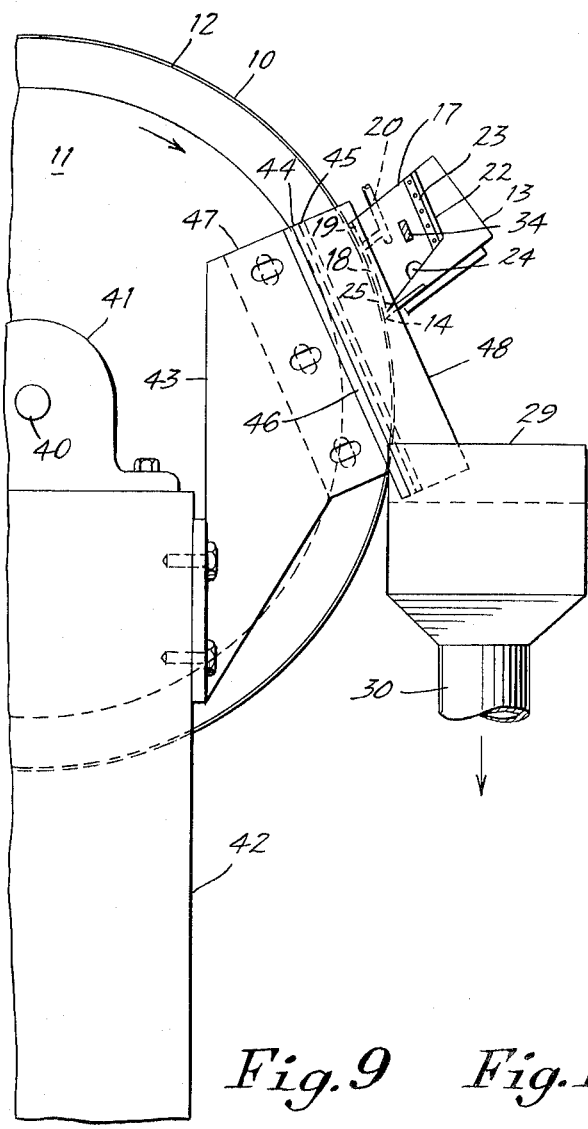
Figure 10:
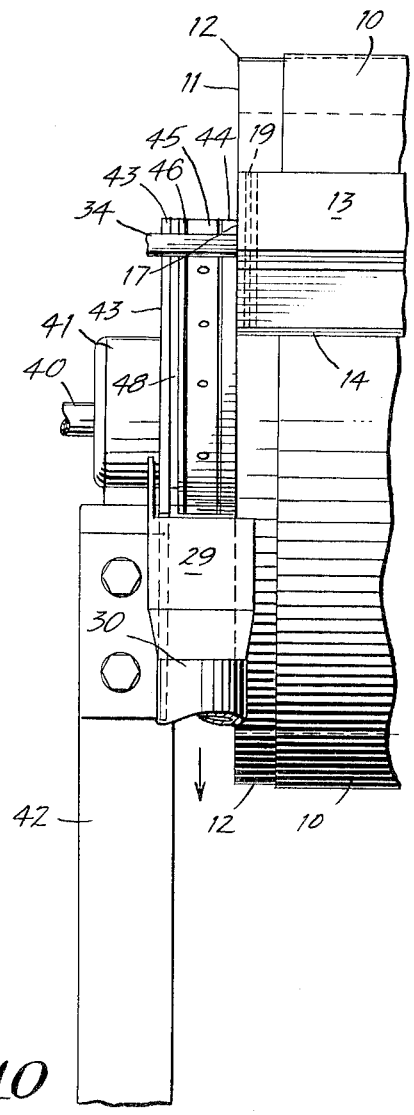
Figure 16:
Figure 15:
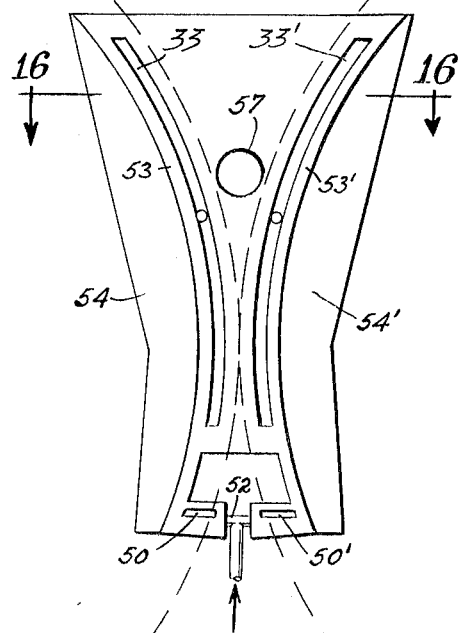

Other objects will become apparent from the following detailed description and the accompanying drawings, in which:

FIGURE 1 is a diagrammatic plan view of an end-dam representing the prior art;
FIGURE 2 is a diagrammatic plan view of one embodiment of the end-dam of the present invention;
FIGURE 3 is a diagrammatic plan view of a second embodiment of the end-dam of this invention;
FIGURE 4 is a perspective view, partly broken away, of the end-dam of FIGURE 2 in operating position on a blade coater;
FIGURE 5 is a side elevation of the end-dam of FIGURE 4;
FIGURE 6 is a section, partly broken away, taken along line 6—6 of FIGURE 5;
FIGURE 7 is a section, partly broken away, taken along line 7—7 of FIGURE 5;
FIGURE 8 is a section, partly broken away, taken along line 8—8 of FIGURE 5;
FIGURE 9 is a side elevation, partly broken away, of an alternate arrangement for removing coating material from the end of the roll, as used with the end-dam of FIGURE 2;
FIGURE 10 is a front elevation, partly broken away, of the apparatus of FIGURE 9;
FIGURE 11 is a partial, perspective view of the end-dam shown in FIGURE 3;
FIGURE 12 is a side elevation of the end-dam of FIGURE 11;
FIGURE 13 is a section along line 13—13 of FIGURE 12;
FIGURE 14 is a section along line 14—14 of FIGURE 12;
FIGURE 15 is a diagrammatic view of the end-dam of this invention adapted to confine a pool of fluent coating material in the nip between two rotating surfaces; and
FIGURE 16 is a section along line 16—16 of FIGURE 15.

In FIGURE 1, a web 10 of paper, paperboard or the like is led downwardly over backing roll 11 which has a resilient cover 12. A coating head 13 carrying blade 14 is mounted so that the blade tip engages the surface of the web 10.

End-dams 16, 16 of the type used prior to this invention are rigidly mounted on the coater head 13 and shaped to conform to the curvature of the resilient surface 12 of roll 11. The end-dams 16—16 are positioned to engage the edges of web 10, and are intended to retain the fluent coating material in the trough formed by the web on the backing roll, the blade, and the coating head.

One embodiment of the improved end-dam of this invention is shown in FIGURE 2. The general features of web 10 supported by resilient cover 12 of backing roll 11 moving past the tip of blade 14 which is mounted on coating head 13 are the same as shown in FIGURE 1, and are not a part of the present invention. In FIGURE 2, the end-dams 17 of this invention are mounted on brackets 34 to a part of the machine frame (not shown) and positioned adjacent the ends of roll 11. The front edge 18 of the end-dam is curved to generally conform to the curvature of roll surface 12, as shown in FIGURES 4 and 5. This front edge is provided with a channel or groove 19 which affords communication by means of conduits 20 to a fluid sealant supply pipe 21. The back edge of end-dam 17 is provided with resilient sealing material 22 which is held in place by clamping plates 23. This back sealing material which may be rubber sheeting, sponge rubber or the like, effects a liquid tight seal with the back wall of coating head 13. Thus, small movement of the coating head and blade toward the backing roll, to compensate for wear of the blade tip, does not require a repositioning of the end-dams. Sealing material 22 may be extended on around the end-dam to give similar flexible seals between the end-dam and other surfaces of the coating head. The dash lines in FIGURE 5 indicate the position of the coating head and blade when backed away from the backing roll and end-dams for cleaning, threading paper through the machine, replacing blades, etc.

The location of the end-dams at the edge of the backing roll face permits the operation of the coater with any desired web width, up to the spacing of the end-dams, without requiring a change in the location of the end-dams. Contrary to expectations, it has been found that no new problems are introduced by contact of the pool of fluent coating material with the surface of the backing roll in the areas not covered by the web. The coating material acts as a lubricant to minimize wear of the roll surface by the blade tip, and leakage of coating at the edge of the web is prevented by a small line or band of coating material which dries on the face of the roll. If this dried coating material accumulates to an objectionable amount, a small water spray directed onto the dried coating on the backing roll will control or eliminate the accumulation of such material. The absence of sealing surfaces bearing on the edges of the paper web greatly reduces the incidence of web breaks caused by wrinkles and cracked or torn edges, thus providing significantly more efficient operation of the coating machine.

Wear on the backing roll by the front edges of the end-dams is eliminated by providing a small but definite clearance between them and by using a fluid for sealing and thus eliminating frictional contact between the moving roll surface and the stationary end-dams. In theory, almost any fluid may be used to form this seal, but in practice air has been found to be highly suitable. The pressure of the air supplied to channel 19 is adjusted to be just sufficient to prevent leakage of coating material past the end-dam, and under these conditions, there is no spraying or splashing of coating material by introduction of surplus air into the pond. Water can be used, but introduces the possibility of diluting the coating material, which is generally undesirable. However, unusual coating compositions may require different sealing fluids, e.g. an inert gas such as nitrogen or a liquid organic solvent may be best suited for particular coating operation. Thus, the invention contemplates the use of any desired fluid to achieve the seal.

The channel 19 is blocked at the top end, as by solder, putty or the like, to prevent free escape of the fluid sealing medium from the top, and close engagement of the bottom end of the channel with the blade prevents free escape of sealing fluid at this point. As a result, only modest quantities of sealing fluid are required to retain the coating material in the pond.

An additional sealing element may be provided, if desired, at the point where the roll surface, blade and end-dam meet. Normally, flexure of the blade causes a small opening here which can allow leakage of coating material from the pond. This is aggravated by the momentum given to the coating material by the motion of the roll, which acts as a pressure head to force liquid coating through the opening. As shown in FIGURE 5, and in greater detail in FIGURE 7, a small piece of flexible sheet material 35, such as plastic, rubber, leather or the like, is clamped by plate 36 to end-dam 17, with a projecting edge which restricts or even blocks the opening 25 caused by flexure of the blade as it bears against the backing roll surface 12.

However, it has been discovered that provision for removal of a part of the coating material from the pond has unexpected benefits in that it minimizes defects in the coated paper caused by grit and dirt lodging under the tip of the blade. By providing for the outflow of a portion of the coating material, grit and dirt are removed from the pool. The out-flowing coating can be discarded, if desired, or passed through a screen and then recycled to the main supply of coating material. The amount of coating flowing out of the opening 25, in the absence of sealing element 35, is not sufficient to remove appreciable amounts of grit and dirt which tend to accumulate in the pond. An additional opening in the end-dam, as shown at 24 in FIGURES 4 and 5, will increase the amount of coating removed from the pool and recycled after screening. While the opening 24 is shown located at the bottom of the end-dam, and toward the rear thereof, the location of such an opening is mostly a matter of choice and other locations serve equally as well.

The coating material flowing out of the pond through openings 24 and 25 is removed from the end of the roll by a jet of air issuing through slot 26 from chamber 27 which is supplied by pipe or hose 28 as shown in FIGURES 4 and 5. The coating from the edge of the roll, as well as that falling freely from opening 24, is collected in catch basin 29 which connects to conduit 30 and has a gap 31 in its wall portion to permit entry of the coating removed from the end of the roll by the air jet. Conduit 30 may discharge to the sewer, but preferably leads to screening and recycling means as aforesaid.

Alternatively, the air jet for removal of coating material from the end roll 11 can be replaced by a flexible wiping member 44 as shown in FIGURES 9 and 10. Here, bracket 43, bolted to coater frame member 42 carries a flexible wiping member 44, suitably made of sheet rubber, leather or the like, which is held in place by clamping members 45 and 46. Member 46 is T-shaped to provide a mounting flange 47 and a splash guard 48 across the top of the T, while the stem of the T forms one clamping surface 46 for wiping member 44. Other parts of this arrangement are substantially as previously described.

Referring to FIGURE 3, another embodiment of the end-dam of this invention is shown wherein the fluid seal is established on the end of the roll, rather than on the face thereof. As in the other embodiments hereinbefore described, a paper or paperboard web 10 is led downwardly around roll 11 having a resilient cover 12, passing through a pool of coating which is maintained in the trough formed by the web and roll face, blade 14 and coating head 13. Block-like members 15 are provided with back-sealing material 22 as previously described. Block members 15 are integrally fastened to plate members 55 which are provided with annular grooves or channels 33. Conduits similar to those shown in FIGURE 5 are provided for introducing a sealing fluid to the channels 33. The end-dam assemblies are mounted independently of coating head 13, as by brackets 34, and catch basins 29 are provided to collect and recirculate coating material which is removed from the pond, as by openings (not shown) provided for this purpose.

Referring to FIGURES 11–14, channel 33 is blocked or closed at its ends as, for example, by solder, putty or the like as shown at 51, to prevent free escape of sealing fluid at these points. A flat air jet is provided through opening 50 and connecting supply conduit 52 to remove coating material from the end of roll 11. A ridge of material 53 is provided adjacent channel 33, and in use, this ridge is positioned close to, but not in contact with the end surface of roll 11. Area 54 adjacent ridge 53 is recessed, as shown in FIGURE 13, to provide greater clearance between this area and the end of the roll. Plate member 55 is cut away as indicated at 56 to accommodate the coating head.

The embodiment shown in FIGURES 11 and 12 can readily be adapted to serve as an end-dam to confine coating material between two rotating surfaces, as shown in FIGURES 15 and 16. In this case, two channels 33, 33' are provided, together with ridges 53, 53', recessed areas 54, 54', air jets 50, 50' and air conduit 52. An opening 57 may be provided for withdrawal and recirculation of a portion of the coating material if desired.

Since the forms of apparatus herein described are for the purpose of illustration only, it is to be understood that the present invention includes all modifications and equivalents which fall within the scope of the invention which is defined by the appended claims.

What is claimed is:

1. In a paper coating apparatus or the like utilizing a pool of backing material the combination comprising: at least one coating roll, a body member forming a wall of said pool, said body member having a surface conforming to the shape of the adjacent surface of said roll, and closely spaced therefrom to form a seal, at least one channel within and substantially coextensive with said surface of said body member, and means including conduit means for introducing a sealing fluid into said channel under sufficient pressure to establish a seal against leakage of coating material from said pool through the space between said coating roll and said body member.

2. Structure according to claim 1 additionally comprising a coating head and a resilient sealing means between said body member and said coating head.

3. Structure according to claim 1, the channeled surface of said body member conforming to the circumferential adjacent surface of said roll.

4. Structure according to claim 2, said body member being mounted independently of the coating head, said resilient sealing means designed to accommodate changes in the position of the coating head.

5. Structure according to claim 1, the channeled surface of said body member conforming to an end surface of said roll.

6. Structure according to claim 1, additionally comprising an air jet constructed and arranged to clean coating material from the end surface of said roll.

7. Structure according to claim 1, said end dam being positioned relatively to said roll at a zone somewhat spaced from and beyond the edge of sheet material being coated thereon.

8. Structure according to claim 1 wherein said fluid is a gas.

9. In a paper coating apparatus or the like utilizing a pool of coating material the combination comprising a pair of backing rolls having aligned end walls, a body member forming a wall of said pool, said body member having a surface relatively closely spaced from and conforming to portions of the surfaces of the adjacent end walls to form a seal, a pair of spaced channels disposed within said surface of said body member with each of said channels substantially coextensive with said surface of said body member and disposed adjacent the periphery of a roll, means including conduit means for introducing a sealing fluid into said channels under sufficient pressure to establish a seal against leakage of coating material from said pool through the space between said rolls and said body members.

10. Structure according to claim 9 wherein said fluid is a gas.

References Cited by the Examiner

UNITED STATES PATENTS

| 577,683 | 2/1897 | Heim | 188—262 |
|---|---|---|---|
| 2,092,974 | 9/1937 | Hiers | 118—413 X |
| 2,176,418 | 10/1939 | Daley | 118—262 |
| 2,252,204 | 8/1941 | Reilly | 117—68 |
| 2,284,874 | 6/1942 | Kokay | 118—262 X |
| 2,560,572 | 7/1951 | Haywood et al. | 117—111 |
| 2,796,846 | 6/1957 | Trist | 118—413 |
| 2,918,899 | 12/1959 | Munton et al. | 118—413 |
| 2,953,476 | 9/1960 | Armstrong | 118—405 X |
| 3,032,007 | 5/1962 | McCauliff | 118—407 |

FOREIGN PATENTS

| 487,115 | 10/1952 | Canada. |
|---|---|---|
| 325,916 | 3/1930 | Great Britain. |

MORRIS KAPLAN, *Primary Examiner.*

JOSEPH B. SPENCER, RICHARD D. NEVIUS, WILLIAM B. PENN, *Examiners.*